F. H. GOODSPEED.
AUTOMATIC POULTRY DUSTER.
APPLICATION FILED MAR. 29, 1911.
1,003,136.
Patented Sept. 12, 1911.
2 SHEETS—SHEET 1.
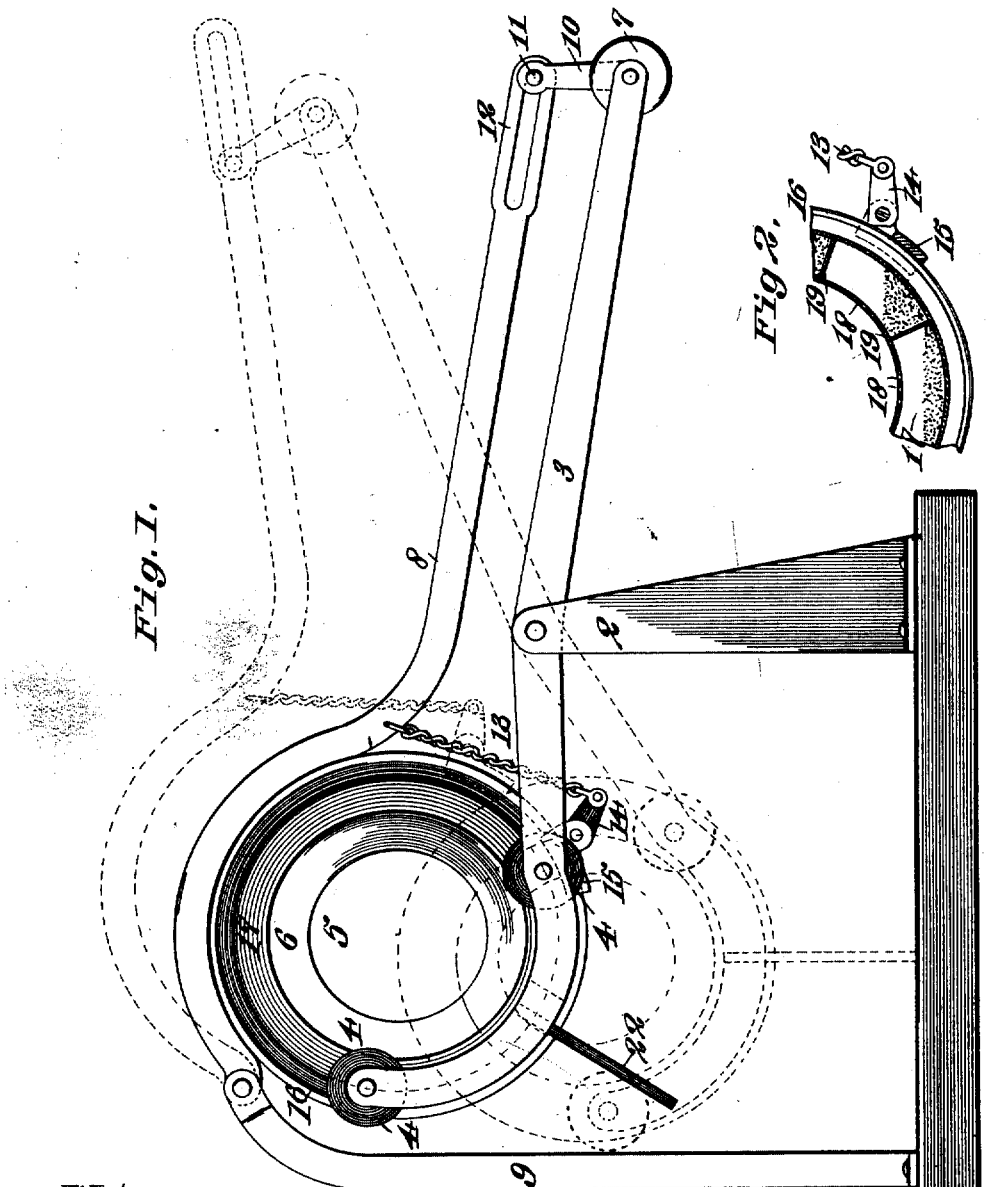
Witnesses:
Charles Pickles
R. S. Bruce
Inventor:
Fred H. Goodspeed
By G. H. Strong.
Atty

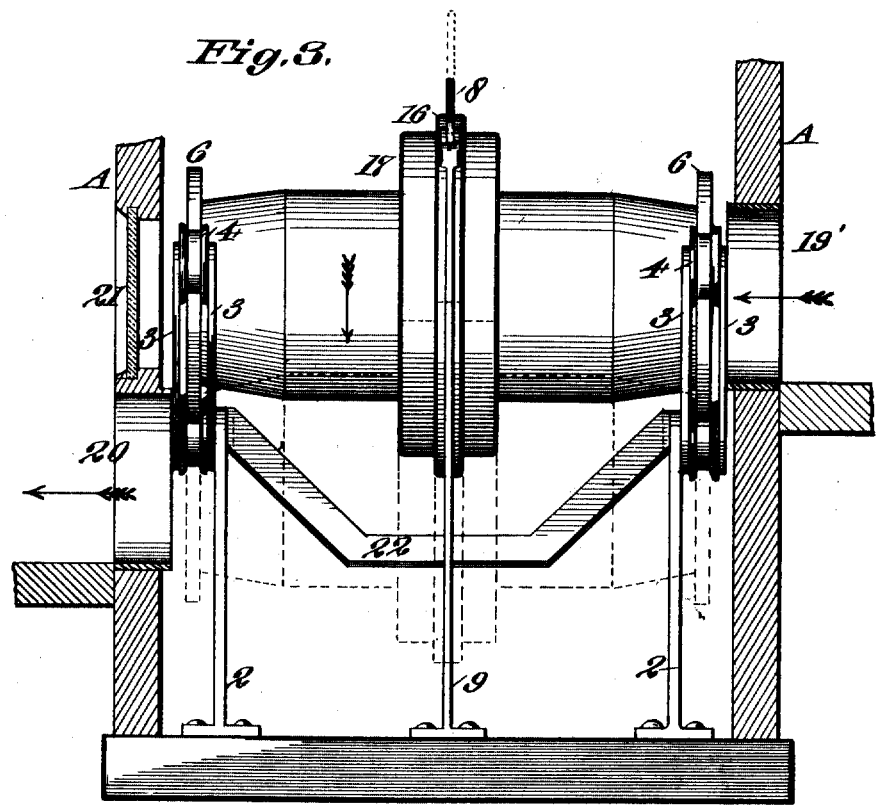

UNITED STATES PATENT OFFICE.

FRED H. GOODSPEED, OF BERKELEY, CALIFORNIA.

AUTOMATIC POULTRY-DUSTER.

1,003,136.  Specification of Letters Patent.  Patented Sept. 12, 1911.

Application filed March 29, 1911. Serial No. 617,656.

*To all whom it may concern:*

Be it known that I, FRED H. GOODSPEED, citizen of the United States, residing at Berkeley, in the county of Alameda and State of California, have invented new and useful Improvements in Automatic Poultry-Dusters, of which the following is a specification.

This invention relates to a device for automatically dusting poultry.

It is the object of this invention to provide an apparatus by means of which insect powder can be automatically distributed among the feathers of fowls, which apparatus is simple in construction and operation.

Another object is to provide a mechanical means for dusting poultry which requires but little attention and which is operated by the fowl passing therethrough, thus doing away with the necessity of having to employ labor for catching the fowls and manually applying the powders.

The value and importance of a device of this character resides in its labor-saving feature, it being especially of service on large poultry farms where the work of dusting poultry has heretofore been generally done by hand and where a large number of fowls have to be caught and treated at frequent intervals.

The invention consists of the parts and the construction and combination of parts, as hereinafter more fully described and claimed, having reference to the accompanying drawings, in which—

Figure 1 is a side elevation of the invention with the housing removed. Fig. 2 is a detail section of the revoluble drum, showing the grip for actuating same. Fig. 3 is an end elevation showing the housing in section. Fig. 4 is a detail longitudinal section of the revoluble drum.

In the drawings A represents a housing in which the operative parts of my invention are mounted, this housing being preferably in the form of a rectangular box, which may be of any suitable material and construction.

Pivotally mounted on standards 2 in the housing A is a rectangular rocking-frame 3, one end of which is downwardly curved on an arc of a circle. A pair of spaced flanged rollers 4 is mounted on each side of the frame 3; these rollers 4 being disposed at the terminations of the curved portion thereof. Supported on these rollers 4 is a revoluble open ended drum 5; this drum having flanges 6 on its outer ends, which flanges rest between the flanges on the rollers 4.

Mounted on the end of the frame 3 opposite the end on which the drum 5 is supported, is a weight 7 which is sufficiently heavy to just overbalance the drum 5 so as to normally retain the latter in its uppermost position, the drum 5 being limited in its upward movement by means of a lever arm 8, which is pivoted on a standard 9 and extends over the top of the drum 5. The outer end of the arm 8 is connected to the weighted end of the rocking-frame 3, a vertical member or yoke 10 on the frame 3 having a pin 11 thereon which extends through a slot 12 on the arm 8.

Connected to the arm 8 at a point adjacent to the drum 5 is a chain 13, which depends from the arm 8 and has a cam clutch 14 attached to its lower end, which clutch is pivoted on a carrier 15 slidably mounted on a grooved flange 16 formed on the drum 5. The flange 16 is disposed centrally of the drum 5 extending therearound and is here shown as consisting of a T-iron which is mounted on an enlarged portion 17 of the drum, which enlarged portion is hollow and communicates with the interior of the drum through a number of slots or perforations 18 and forms a receptacle or container for insect powder. The powder receptacle 17 is divided into a series of compartments by means of partitions 19, as shown in Fig. 2.

The inner walls of the drum 5 slope downward from the outer open ends of the drum toward the center, so that when insect powder is placed in the drum and the latter revolved it will move toward and pass through the perforations 18 disposed at the lowermost point and thus enter the compartment in the receptacle 17 therebeneath.

The housing A is provided with an opening 19' in one of its walls, which opening is opposite the open end of the drum 5 when the latter is in its uppermost position, as shown in Fig. 3, and has a similar opening 20 on the other wall which registers with the open end of the drum 5 when the latter is in its lowermost position, indicated in dotted lines in Figs. 1 and 3.

In operation, insect powder is placed in a number of the receptacles 17 through the perforations 18, as before described, and the housing A is placed in front of a poultry run or house with the opening 19' aligned with the exit thereof. The run or house is then closed to prevent the escape of fowls only through the opening 19' and the run or house darkened. A fowl seeking to escape will be attracted by the light diffused through the opening 19' from the outer end of the drum 5, a glass or screen covered opening 21 in the housing A being provided to admit the light at this point and will enter the drum through the opening 19'. The weight of the fowl will cause the end of the rocking-frame 3 carrying the drum 5 to move downward. This downward movement will cause the weighted end of the frame 3 to move upward, as indicated in dotted lines in Fig. 1, so as to rock the lever arm 8 in an upward direction. This causes the arm 8 to exert an upward pull on the chain 13 which causes the clutch 14 to grip the peripheral face of the flange 16 and thereby rotate the drum 5 a partial revolution. This rotary movement of the drum 5 as it moves downward causes the fowl therein to scramble forward and spread its wings and feathers in order to maintain its balance. As this occurs, the insect powder in the compartment or receptacle 17 moving to the highest portion of the drum is discharged through the perforations 18. The powder is thus effectively sprinkled upon the fowl before the drum 5 reaches its lowermost position. As soon as the drum reaches the limit of its downward movement, which is arrested by a hanger 22 on the frame 3 coming in contact with the bottom of the housing A, the fowl in the drum is permitted to pass therefrom through the opening 20; the drum returning to its normal position when relieved of the weight of the fowl. Such of the insect powder as is not deposited on the fowl in the operation just described passes through the perforations 18, disposed at the lowermost point in the bottom of the drum, and is carried up on each succeeding operation to be again discharged. As the drum 5 and frame 3 return to normal the clutch 14 rides freely over the surface of the flange 16 into position to be again operated.

From the foregoing it will be seen that I have provided a simple and efficient device for sprinkling insect powder on fowls and by means of which a large number of fowls may be treated in a short space of time. By inclining the interior walls of the drum 5 toward the perforations 18 so as to deliver the powder thereto, an economical use of powder is assured.

Having thus described my invention, what I claim and desire to secure by Letters Patent, is—

1. A device for dusting poultry, comprising a rocking-frame, a drum revolubly mounted thereon, powder receptacles on said drum, and means by which a fowl entering said drum will cause it to revolve.

2. A device for dusting poultry, comprising a rocking-frame, a drum revolubly mounted thereon, powder receptacles on said drum, means by which a fowl entering said drum will cause it to revolve, said drum having powder outlets through which powder will be delivered during the revolution of the drum.

3. A device for dusting poultry, consisting of a rocking-frame, rollers on said frame, a drum supported on said rollers, and means by which the weight of a fowl will cause said frame to rock and move said drum in a downward direction.

4. A device for dusting poultry, consisting of a rocking-frame, rollers on said frame, a drum supported on said rollers, means by which the weight of a fowl will cause said frame to rock and move said drum in a downward direction, and means whereby the downward movement of the drum will cause it to rotate.

5. A device for dusting poultry, consisting of a rocking-frame, rollers on said frame, a drum supported on said rollers, means by which the weight of a fowl will cause said frame to rock and move said drum in a downward direction, means whereby the downward movement of the drum will cause it to rotate, a series of powder receptacles on said drum, said receptacles having outlets through which during the rotation of the drum powder will be delivered from certain of said receptacles to the interior of the drum.

6. A device for dusting poultry, consisting of a rocking-frame, rollers on said frame, a drum supported on said rollers, means by which the weight of a fowl will cause said frame to rock and move said drum in a downward direction, means whereby the downward movement of the drum will cause it to rotate, a series of powder receptacles on said drum, said receptacles having outlets through which during the rotation of the drum powder will be delivered from certain of said receptacles to the interior of the drum, said drum having openings for admitting a fowl to the interior of the drum, and for permitting its escape therefrom.

7. A device for dusting poultry, consisting of a rocking-frame, rollers on said frame, a drum supported on said rollers, means by which the weight of a fowl will cause said frame to rock and move said drum in a downward direction, means whereby the downward movement of the drum will cause it to rotate, a series of powder receptacles on said drum, said receptacles having outlets through which during the rotation of the drum powder will be delivered from certain of said receptacles to the interior of the drum, said drum having openings for admitting a fowl to the interior of the drum, and for permitting its escape therefrom, and means for automatically rocking the frame to move the drum upward when relieved of the weight of a fowl.

In testimony whereof I have hereunto set my hand in the presence of two subscribing witnesses.

FRED H. GOODSPEED.

Witnesses:
CHARLES EDELMAN,
M. COOK.